Oct. 8, 1957  J. R. ALTIERI  2,809,351
CONVERSION DEVICE
Filed Oct. 19, 1954
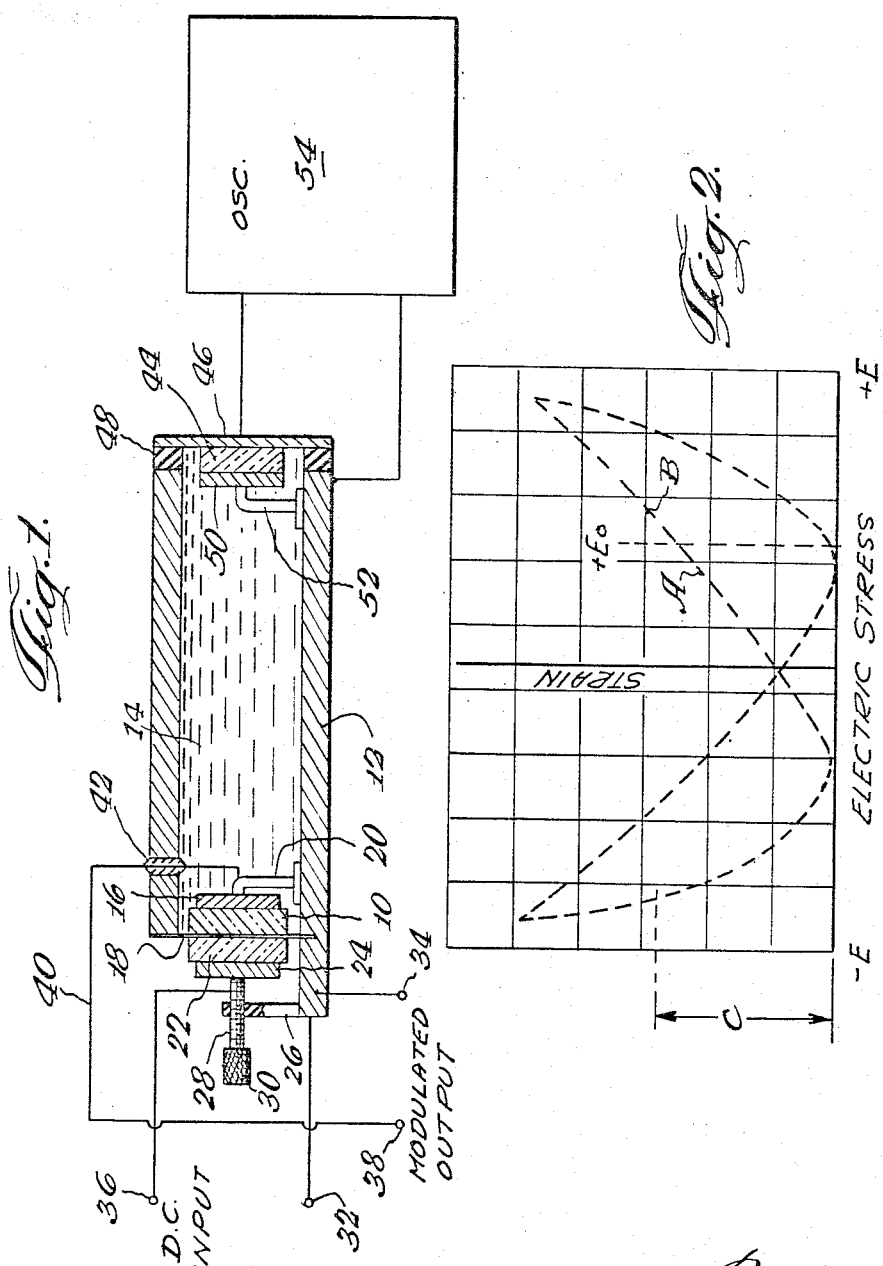
Inventor
Joseph R. Altieri
By Alois W. Graf
Attorneys

United States Patent Office 2,809,351
Patented Oct. 8, 1957

2,809,351

CONVERSION DEVICE

Joseph R. Altieri, Watertown, Mass., assignor to Acton Laboratories, Inc., Acton, Mass.

Application October 19, 1954, Serial No. 463,221

3 Claims. (Cl. 332—2)

The present invention relates to devices for converting electrical signals into alternating current signals, particularly devices for converting direct current signals into alternating current signals.

Direct currents which require amplification before they may be utilized have always posed a problem, since direct current amplifiers are relatively unstable and have relatively poor amplification ratios compared with alternating current amplifiers. As a result, there have been many attempts to convert direct currents into alternating currents so that the direct current signals may be amplified by an alternating current amplifier. An example of the devices which have been used to transform direct currents to alternating currents is the chopper circuit, particularly the vibrating reed type, which chops a direct current signal into a pulsating signal which can then be amplified by an alternating current amplifier. One of the disadvantages of chopping devices is that the frequency of the alternating current signal produced from the direct current signal is determined by the mechanical chopping rate, and hence it is difficult to maintain the frequency of the alternating current signal constant. Efforts to maintain the frequency of the converted signal constant have led to rather complicated structures which are costly and delicate.

It is an object of the present invention to provide a device for converting voltage signals into alternating current signals, particularly a conversion device which is simple and reliable.

It is a further object of the present invention to provide a device for converting direct current signals into alternating current signals which produces an alternating current signal with relatively high frequency stability.

Other objects and advantages of the present invention will become apparent from a further reading of the present disclosure, particularly when viewed in the light of the drawings, in which:

Figure 1 is a view of a conversion device constructed according to the teachings of the present invention shown partly in section and partly schematic; and Figure 2 is a graph showing the relation between electrical stress and strain upon a crystal exhibiting electrostrictive properties.

The present invention utilizes the electrical stress to strain relationship of anisotropic dielectrics having an asymmetrical atomic structure. As is well known, the electrostrictive strain produced by an electric field is essentially proportional to the square of the electric field intensity. Broadly, a conversion device constructed according to the teachings of the present invention utilizes an electrostrictive material provided with means to apply a mechanical strain on the electrostrictive material that is related to the signal to be converted to alternating current, and a second means to apply a periodic strain upon the electrostrictive material with the frequency of the alternating current output.

The invention may be more clearly understood with reference to Figure 1. An electrostrictive body 10 is mounted adjacent to the interior side of one end of an elongated fluid tight housing 12 which is filled with an electrically insulating pressure transmitting medium in the form of a fluid, such as a light oil 14. The electrostrictive body 10 is disposed between a pair of confronting electrically conducting electrodes 16 and 18, the electrode 18 being in the form of a thin flexible metallic membrane which forms one end of the elongated housing 12. The electrode 16 is secured to the housing 12 by a bracket 20 which is constructed of electrically conducting material and electrically connects the electrode 16 to the electrically conducting housing 12.

A wide band electromechanical transducer 22 in the form of a crystal is disposed in contact with the electrode 18 exterior to the housing 12 and adjacent to the electrostrictive body 10. The crystal 22 utilizes the electrode 18 as one of its electrodes also, and a second electrode 24 is disposed on the side of the crystal 22 opposite to the membrane 18. The second electrode 24 is mechanically connected to the housing 12 by an electrically insulating bracket 26 and a threaded shaft 28 which is threaded through the bracket 26. The end of the shaft 28 opposite to the electrode 24 is provided with a knob 30 which may be used to adjust the pressure on the crystal 22 and the electrostrictive body 10 exerted between the electrodes 24 and 16. While the selection of the pressure applied to the crystal 22 and electrostrictive body 10 is not critical to the present invention, it is necessary that some pressure be exerted upon the crystal 22 and upon the electrostrictive body 10 in order for these elements to perform properly, and as a result, the pressure exerted through the electrodes 16 and 18 upon the electrostrictive body 10 provides the electrostrictive body with a potential difference between the electrodes 16 and 18 at all times which may be considered in the nature of a bias potential. This potential appearing across the electrostrictive body 10 has been designated $E_0$ in Figure 2, and it determines the portion of the mechanical strain to electrical stress curve in which the conversion device will operate. This region has been designated A, B in Figure 2.

Since it is mechanically convenient to operate electrode 18 at the potential of the housing 12, the housing 12 is electrically connected to one of the input terminals 32 and one of the output terminals 34 which is to carry the alternating current signal. The other input terminal 36 is electrically connected to the electrode 24, and the other output terminal 38 is electrically connected to the electrode 16 by a conductor 40 which extends into the housing 12 through an electrical insulator 42.

In the embodiment of the invention illustrated in Figure 1, the periodic strains upon the electrostrictive body 10 are provided by an oscillating crystal 44 disposed within the housing 12 adjacent to the end thereof opposite to the membrane 18. An electrically conducting plate 46 is disposed at this end of the housing 12 and insulated from the rest of the housing by an electrically insulating ring 48, and the crystal 44 is disposed in contact with the plate 46. A second electrically conducting electrode 50 is disposed within the housing in contact with the surface of the crystal 44 opposite to the plate 46, the electrode 50 being supported and electrically connected to the housing 12 by an electrically conducting bracket 52. The crystal 44 is maintained in a vibrating condition by energy supplied from an electrical oscillator 54 of conventional construction which is connected to the housing 12 and to the plate 46.

In the particular embodiment of the invention disclosed in Figure 1, the housing 12 is designed to transmit a maximum quantity of energy from the crystal 44 to the electrostrictive body 10 by making this distance a ¼ wave length long. In this manner, the amount of energy supplied to the coupling fluid 14 can be minimized without reducing the mechanical strain applied to the electrostrictive body 10, although it will be understood that the present invention may be practiced without providing a resonance coupling device between the electrostrictive body 10 and the crystal 44. The electromechanical transducer 22 should be selected for a linear relation between the applied electric displacement and the peak sinusoidal amplitude displacement strain during continuous operation over a wide band of frequencies. For this reason a Rochelle salt crystal has been employed for the electromechanical transducer 22. It should also be borne in mind, that an electromechanical transducer which produces a displacement strain varying relative to the frequency of the incident electrical signal can be used to convert frequency modulated signals into amplitude modulated alternating current signals. The electrostrictive body 10 may be constructed of any of the conventional electrostrictive materials, electrostrictive multicrystalline ceramics being particularly suitable. For this reason, the electrostrictive body 10 is constructed of barium-lead-titanate.

It will be seen, that the present invention provides a simple device for converting direct current electrical signals into alternating current electrical signals, and that the frequency of the alternating current signals produced will possess a high degree of inherent stability due to the fact that the frequency of the alternating current signal is controlled by a crystal. The man skilled in the art will readily devise modifications and utilities for the present invention from the foregoing disclosure, and hence it is intended that the scope of the present invention be not limited by the foregoing disclosure but rather only by the appended claims.

What is claimed is:

1. A device for converting direct current signals into alternating current signals comprising an elongated housing, a first crystal having a pair of parallel surfaces on opposite sides thereof disposed within the housing normal to the axis of elngation thereof, means to apply a sinusoidal electrical potential to the parallel surfaces of the crystal, an electrostrictive body having a pair of flat parallel surfaces on opposite sides thereof disposed within the housing with said surfaces normal to the axis of elongation of the housing, a thin electrically conducting compliant membrane disposed adjacent to the flat surface on the side of the electrostrictive body opposite to the crystal, a second crystal having a pair of parallel flat surfaces on opposite sides thereof, one of the surfaces contacting the thin membrane on the side opposite to the electrostrictive body, an electrode disposed in contact with the other surface of the crystal, a second electrode in contact with the surface of the electrostrictive body opposite to the membrane, and a liquid disposed within the housing between the first crystal and the electrostrictive body for transmitting mechanical vibrations from the first crystal to the elecrostrictive body, whereby the direct current voltage may be impressed between the thin membrane and the electrode contacting the opposite surface of the second crystal and an alternating potential modulated by the direct current signal appears between the thin membrane and the electrode confronting the opposite surface of the electrostrictive body.

2. A device for converting a direct current signal to an alternating current signal comprising the elements of claim 1 wherein the distance between the electrostrictive body and the first crystal is a distance equal to an odd multiple of a quarter wave length of the frequency of oscillation of the first crystal in the fluid medium disposed within the housing.

3. A device for converting direct current electrical signal to alternating current electrical signals comprising an elongated tubular housing constructed of electrically conducting materials, a thin electrically conducting compliant membrane disposed at one end of the tubular housing and forming a fluid tight seal therewith, an electrostrictive body having a pair of parallel surfaces on opposite sides thereof disposed within the housing, one of said surfaces being in contact with the thin membrane, an electrode disposed in contact with the other surface of the membrane an electrically insulating bracket mechanically attaching said electrode to the housing an electrically conducting plate disposed adjacent to the end of the housing opposite to the membrane, an electrically insulating ring disposed between the plate and the housing froming a fluid tight seal between the housing and the plate, a second electrically conducting electrode disposed within the housing confronting the plate, a first crystal disposed between the second electrode and the plate, means to apply a sinusoidal electrical potential to the second electrode and the plate, a pulse transporting electrically insulating liquid within the housing, a second crystal having a pair of parallel surfaces on opposite sides thereof, one of the surfaces of the second crystal contacting the membrane adjacent to the electrostrictive body, a third electrode disposed in contact with the other surface of the second crystal, and means to mount said third electrode to the housing including a bracket constructed of electrically insulating material attached to the housing, and a threaded shaft threaded through the bracket having one end in contact with the third electrode, whereby the potential to be transformed may be applied between the membrane and the electrode confronting the second crystal and the alternating current modulated by the direct current signal appears between the membrane and the electrode confronting the electrostrictive body.

References Cited in the file of this patent

UNITED STATES PATENTS

| 1,495,429 | Nicolson | May 27, 1924 |
| 2,484,636 | Mason | Oct. 11, 1949 |
| 2,581,780 | Ahier et al. | Jan. 8, 1952 |